(12) United States Patent
Salapura et al.

(10) Patent No.: US 10,701,141 B2
(45) Date of Patent: Jun. 30, 2020

(54) MANAGING SOFTWARE LICENSES IN A DISAGGREGATED ENVIRONMENT

(71) Applicant: International Business Machines Corporation, Armonk, NY (US)

(72) Inventors: Valentina Salapura, Chappaqua, NY (US); John Alan Bivens, Ossining, NY (US); Min Li, San Jose, CA (US); Ruchi Mahindru, Elmsford, NY (US); Harigovind V. Ramasamy, Ossining, NY (US); Yaoping Ruan, White Plains, NY (US); Eugen Schenfeld, South Brunswick, NJ (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 15/199,543

(22) Filed: Jun. 30, 2016

(65) Prior Publication Data
US 2018/0007127 A1    Jan. 4, 2018

(51) Int. Cl.
*H04L 29/08* (2006.01)
*G06F 9/455* (2018.01)
(Continued)

(52) U.S. Cl.
CPC ...... *H04L 67/1023* (2013.01); *G06F 9/45558* (2013.01); *G06F 21/105* (2013.01);
(Continued)

(58) Field of Classification Search
CPC ............ H04L 67/1023; H04L 12/1439; H04L 47/783; H04L 47/827; H04L 67/10; G06F 9/45558; G06F 2009/45595
See application file for complete search history.

(56) References Cited

U.S. PATENT DOCUMENTS 5,390,297 A * 2/1995 Barber ............... G06F 21/105
705/59
7,636,693 B2 * 12/2009 Faur .................. G06F 21/10
705/59
(Continued)

OTHER PUBLICATIONS

Tamm et al., "Electronic commerce business concepts for server based computing," Proceedings of ITS, 2000.

*Primary Examiner* — Philip J Chea
*Assistant Examiner* — Robert B McAdams
(74) *Attorney, Agent, or Firm* — Jeffrey S. LaBaw; David H. Judson

(57) ABSTRACT

Server resources in a data center are disaggregated into shared server resource pools. Servers are constructed dynamically, on-demand and based on a tenant's workload requirements, by allocating from these resource pools. The system also includes a license manager that operates to manage a pool of licenses that are available to be associated with resources drawn from the server resource pools. Upon provisioning of a server entity composed of resources drawn from the server resource pools, the license manager determines a license configuration suitable for the server entity. In response to receipt of information indicating a change in a composition of the server entity (e.g., as a workload is processed), the license manager determines whether an adjustment to the license configuration is required. If so, an adjusted license configuration for the server entity is determined and tracked to the tenant. The data center thus allocates appropriate licenses to server entities as required.

21 Claims, 9 Drawing Sheets

(51) Int. Cl.
   *H04L 12/911* (2013.01)
   *H04L 12/14* (2006.01)
   *G06F 21/10* (2013.01)

(52) U.S. Cl.
   CPC ........ *H04L 12/1439* (2013.01); *H04L 47/783* (2013.01); *G06F 2009/45595* (2013.01); *G06F 2221/2141* (2013.01)

(56) References Cited

U.S. PATENT DOCUMENTS

| | | | | |
|---|---|---|---|---|
| 8,082,547 | B1 * | 12/2011 | Herington | G06F 9/5077 705/59 |
| 8,650,296 | B1 * | 2/2014 | Herington | G06F 9/5077 709/226 |
| 8,954,698 | B2 | 2/2015 | Schenfeld et al. | |
| 2003/0229529 | A1 | 12/2003 | Mui et al. | |
| 2005/0102674 | A1 * | 5/2005 | Tameshige | G06F 9/5011 718/100 |
| 2006/0085350 | A1 * | 4/2006 | Samayamantry | G06Q 30/02 705/59 |
| 2007/0245423 | A1 * | 10/2007 | Herington | G06F 21/10 726/31 |
| 2007/0255813 | A1 * | 11/2007 | Hoover | G06F 9/5061 709/223 |
| 2009/0043877 | A1 * | 2/2009 | Grimm | G06F 9/5083 709/223 |
| 2009/0177740 | A1 * | 7/2009 | Curren | G06F 21/10 709/203 |
| 2012/0330700 | A1 * | 12/2012 | Garg | G06Q 10/00 705/7.11 |
| 2013/0091282 | A1 * | 4/2013 | Tontiruttananon | G06F 9/5061 709/226 |
| 2015/0271865 | A1 | 9/2015 | Carson et al. | |

* cited by examiner

MANAGING SOFTWARE LICENSES IN A DISAGGREGATED ENVIRONMENT

BACKGROUND OF THE INVENTION

Technical Field

This disclosure relates generally to data processing systems in a data center operating environment.

Background of the Related Art

A well-known information technology (IT) delivery model is cloud computing, by which shared resources, software and information are provided over the Internet to computers and other devices on-demand. Cloud computing significantly reduces IT costs and complexities while improving workload optimization and service delivery. With this approach, an application instance is hosted and made available from Internet-based resources that are accessible, e.g., through a conventional Web browser over HTTP. Cloud compute resources typically are housed in large server farms that run one or more network applications, typically using a virtualized architecture wherein applications run inside virtual servers, or so-called "virtual machines" (VMs), that are mapped onto physical servers in a data center facility.

Within the data center itself, a data center network typically is architected according to a hierarchical design comprising several layers of electrical switches, namely, access, aggregate and core layers. At a front end of the data center, content and load balancing switches are connected to the Internet through gateway routers, while at the back end, they are linked to core switches. Typically, the core switches are linked to aggregate switches, and the aggregate switches are connected to rack switches. Each rack switch is connected to the servers in the rack. The switches in the data center network operate usually over an electronic switch fabric, and the links between them either are copper cables or optical fibers. When a request comes from the external network, it first comes to the load balancing and content switches, which route the request to the appropriate servers. To fulfil the request, the servers can coordinate with other servers within the same or different racks. For example, the application servers can coordinate with the database servers to process the request. After completing the request, the response is sent to the external network through the gateway routers.

Conventional data center architectures such as described face many challenges including, without limitation, scalability, fault tolerance and energy efficiency. As a consequence, many are hard-pressed to handle the growing demand of cloud computing.

Data center performance also is impacted by the nature of the hardware systems that comprise the data center. Currently, hardware systems are prepackaged with a pre-defined number of CPUs and memory, which limits flexibility. For example, in a typical virtual machine environment, the number of virtual CPUs is defined, and memory is allocated. While a number of virtual CPUs can be changed in such an environment, there is no way to specify which physical CPUs are to be used, or how to increase the number of physical CPUs.

One solution to these issues is a "disaggregated server" environment. In the disaggregated server approach, similar types of server resources in the data center are aggregated in respective pools, such as a compute pool, a memory pool, and a storage pool. A server is then constructed dynamically by allocating from the pools appropriate amounts of resources to meet the requirements of a tenant's workload. The disaggregated server approach provides higher resource utilization as compared to conventional data center architectures, as given components can be used, re-used or shared among different tenants and processing components.

Many software products used in the data center also require appropriate licensing. Currently, there are various ways to license a software product. In one typical licensing model, software is allowed to run a certain hardware system, e.g., a system that is specified by a unique ID associated with its CPU. Another licensing model may be used where the environment is virtualized (i.e., where a virtual machine (VM) is disconnected from its underlying hardware system), because the VM can move to a different hardware system. In this case, the licensing model typically provides that all servers where the VM can be hosted (called a cluster) are accounted for under the license, and thus all servers in the cluster are included in the licensing cost. Of course, the cost of a license may scale linearly as the number of servers increases. For example, consider the well-known Microsoft® Service Provider License Agreement (SPLA) model and its use in a virtualized environment, wherein third parties desire to provide software services and hosted applications to end customers using the SPLA-provided software. In this approach, software can be licensed per hypervisor (the whole server is covered) independently of the number of VMs running on it, or it can be licensed for up to a given number (e.g., 4) VMs per server if the virtual machines are not organized in a cluster. Additionally, when servers are organized as a cluster, then the number of servers in the cluster is counted, and all servers in the cluster have to be covered by licenses. In any case, the licensing cost(s) can become prohibitive very quickly in such a scenario. Further, finding an optimal licensing arrangement (e.g., a minimum number of required licenses to satisfy a current workload) is frequently not trivial.

Software licensing represents a significant challenge in a disaggregated system, as such systems are not prepackaged with pre-defined number of CPUs and memory. Moreover, these types of systems can be scaled up or down with additional (or reduced) memory and CPUs, or even suspended. Further, disaggregated systems offer levels of resiliency (including at the component level) that have not possible to implement before. For example, if a CPU on a disaggregated server fails, then additional CPUs can be added seamlessly. As the composition of a disaggregate server varies—often dynamically—the software executing on or in association with that server necessarily is impacted.

While disaggregated systems of this type thus provide significant advantages, there remains a need to address the problem of how to manage software licenses when components of the server are changing and to otherwise enable the server to continue to run its workload appropriately.

BRIEF SUMMARY

Server resources in a data center are disaggregated into shared server resource pools. Servers are constructed dynamically, on-demand and based on a tenant's workload requirements, by allocating from these resource pools. The system also includes a license manager that operates to manage a pool of licenses that are available to be associated with resources drawn from the server resource pools.

According to a first aspect of this disclosure, upon provisioning of a server entity composed of resources drawn from the server resource pools, the license manager determines a license configuration suitable for the server entity. The license configuration includes at least one license drawn from the pool of licenses, wherein the at least one license drawn from the pool of licenses is then marked in the pool of licenses as unavailable. In response to receipt of information indicating a change in a composition of the server entity, the license manager determines whether an adjustment to the license configuration is required. Upon a determination that an adjustment to the license configuration is required, an adjusted license configuration for the server entity is determined and tracked to the tenant.

According to a second aspect of this disclosure, an apparatus for managing licenses in a disaggregated compute environment is described. The apparatus comprises a set of one or more hardware processors, and computer memory holding computer program instructions executed by the hardware processors to perform a set of operations such as the steps described above.

According to a third aspect of this disclosure, a computer program product in a non-transitory computer readable medium for use in a data processing system for managing licenses in a disaggregated compute environment is described. The computer program product holds computer program instructions executed in the data processing system and operative to perform operations such as the steps described above.

The aspects of the disclosure outlined above provide significant advantages. They enable initial resources and their applicable software licenses to be appropriately allocated based on projected need, and to have the appropriate licenses adjusted to conform to any dynamic scale-up or scale-down (or failover) of physical or virtual hardware capacity. Because a server entity is built-up from allocation of a subset of processors, a subset of memory, etc., only those resources that are needed to handle the workload are used, and only those licenses that are necessary to facilitate that workload processing are applied. Further, when changes to the server entity are required or occur, the system adjusts the licenses needed. Because the overall approach leverages disaggregated servers, the data center provider realizes greater modularity, higher resource utilization, and better performance, while the data center customer (user) obtains such benefits at lower costs of licensing. This provides a way for a data center to operate in a much more cost-effective and reliable manner, and to provide its customers with appropriate licenses, and preferably only those licenses that are needed for their varying workload requirements (even as those requirements vary dynamically).

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The techniques of this disclosure preferably are implemented within the context of a "disaggregated" compute system wherein a "disaggregated server"—sometimes referred to herein as a "server entity"—is composed or constitutes server resources selected from (or assigned from) shared server resource pools, namely, one or more of: a compute pool, a memory pool, an accelerator pool (e.g., a GPU accelerator, a network accelerator, etc.), a storage pool, and so forth. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

In a preferred embodiment, and as now described below, a disaggregated compute system in which the teachings of this disclosure are practiced utilizes optical (as opposed to electrical) interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

Switching Optically-Connected Memory Architecture

By way of background, but not by way of limitation, the following describes a representative computer environment in which the techniques of this disclosure (described below) may be practiced.

Figure 1:
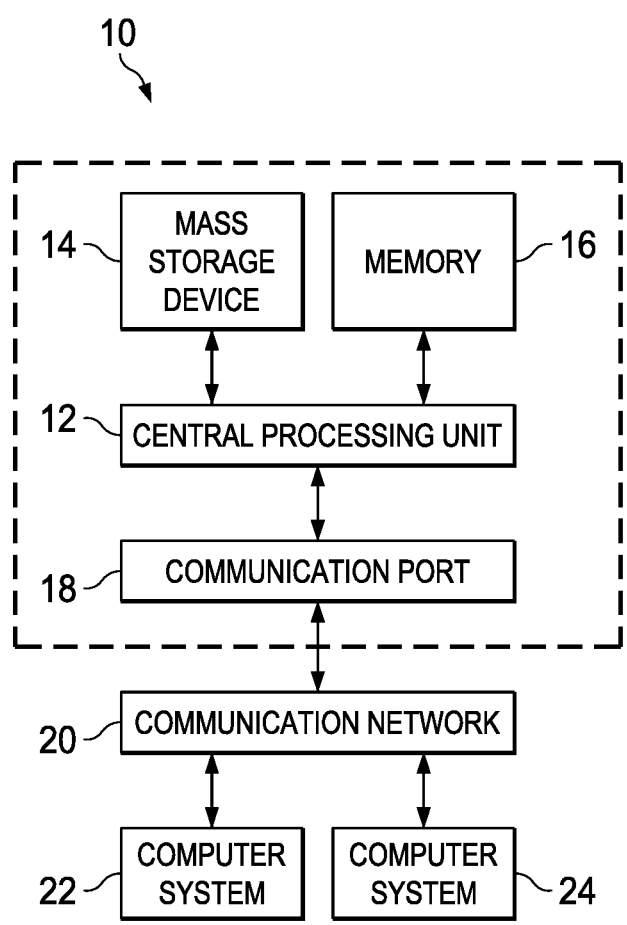
FIG. 1 depicts an exemplary block diagram illustrating a computing system environment in which exemplary aspects of the disclosure may be implemented.

Turning now to FIG. 1, exemplary architecture 10 of a computing environment in which the disaggregated compute system of this disclosure may be implemented is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
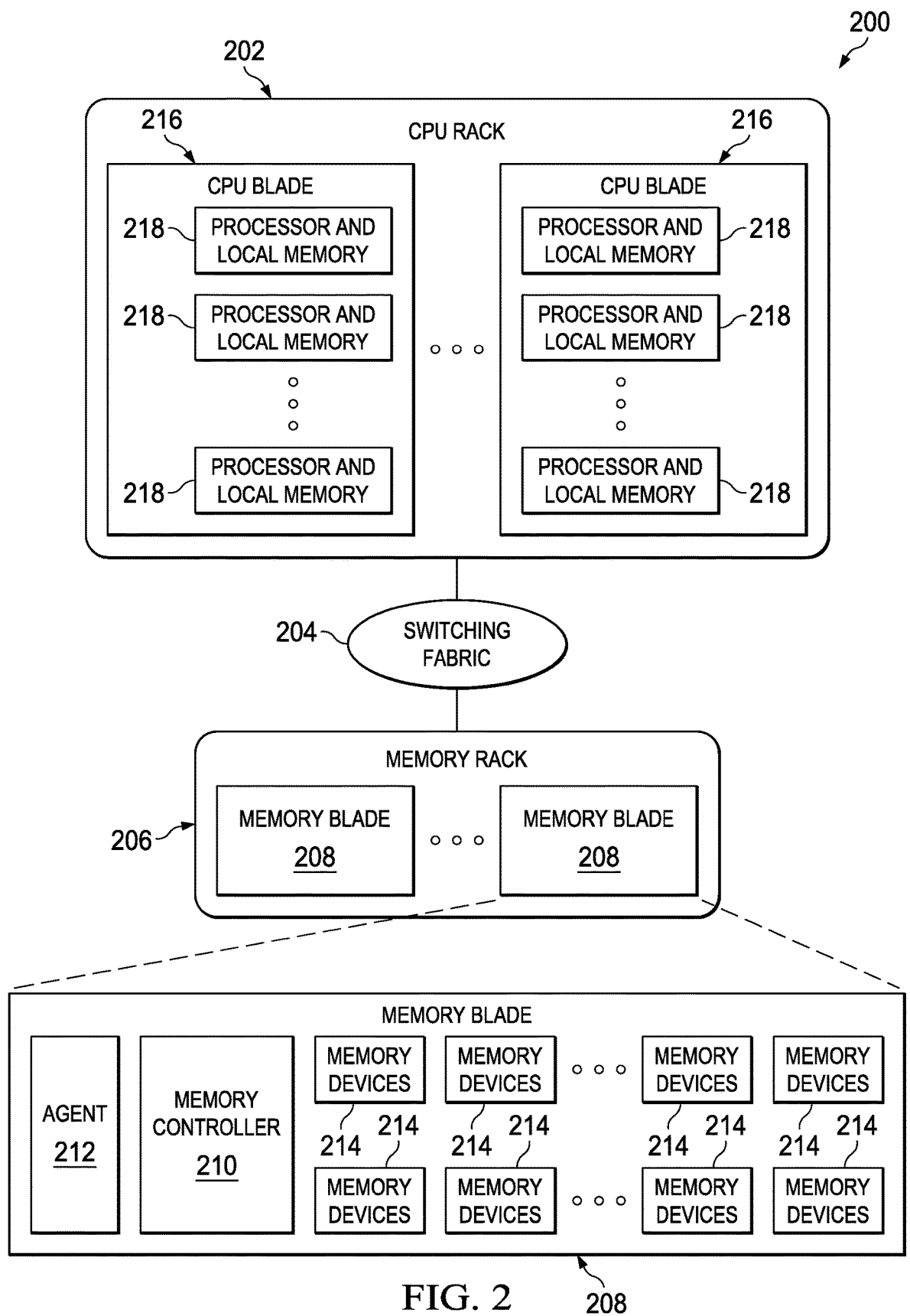
FIG. 2 is an exemplary block diagram of a hardware structure of an optically-connected memory system in which aspects of the illustrative embodiments may be implemented.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an Optically-Connected Memory (OCM) system 200, the CPU 218 and memory 214 are organized into separate racks 202 and 208 connected through optical links and at least one switching fabric 204. In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, or in the protocol chosen to facilitate such high bandwidth, and preferably it has the ability to support memory switching within one physical link or multiple physical links to look like one high bandwidth physical link made of a few physical links. Because these external links typically are circuit-switched via at least one optical switch 204 that will not be aware of the data or content thereof, these should use a very lightweight communication protocol.

The physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. Preferably, and in the embodiment depicted, these external links are common to all memory blades and processor blades.

In the preferred architecture, at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Because these external links are circuit switched via an all optical switch that will not be aware of the protocol, data or content thereof, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically-connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310a-n, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
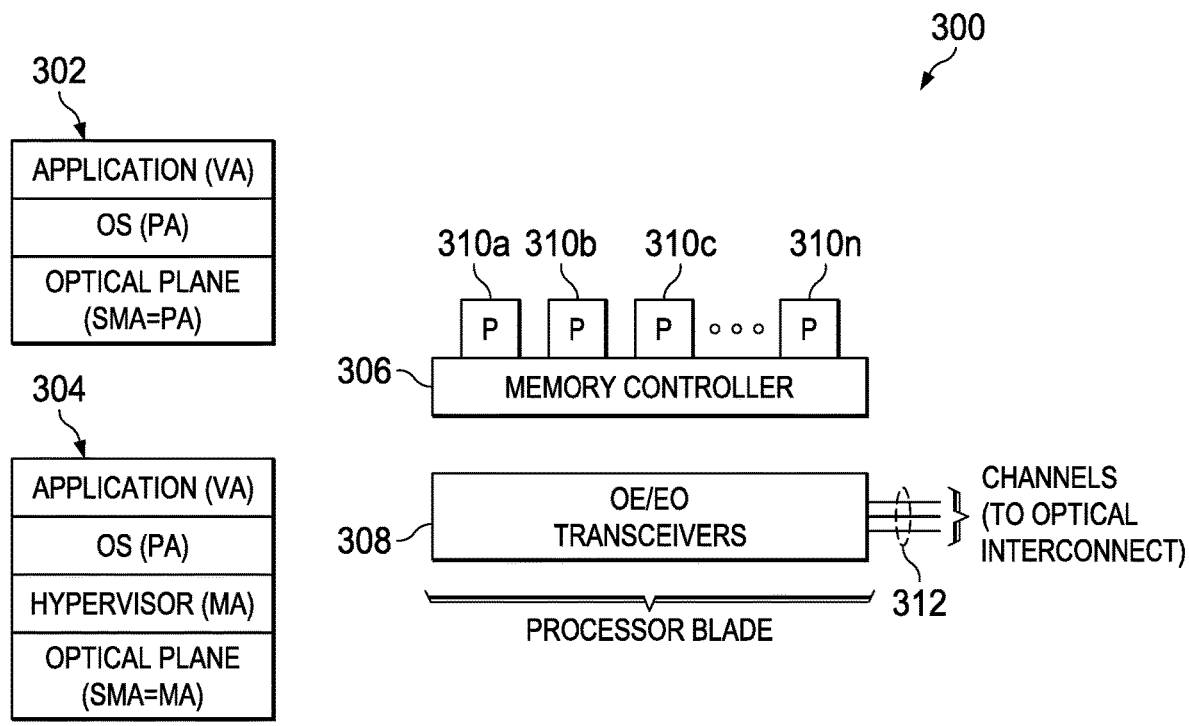
FIG. 3 depicts a block diagram illustrating a hardware structure of a processor design in the optically-connected memory system in FIG. 2.

Turning now to FIG. 3, FIG. 3 is a block diagram 300 showing a hardware structure of a processor design in the optically-connected memory system in a computer system. As illustrated in FIG. 3, the processor side design 300 illustrates: software stack in system (without virtualization) 302 and 304 (with virtualization), and the processor blade communicates with remote memory blades through optical transceiver 308 and 312. There is a memory controller 306 associated with local memory pool 310a-n. If a System Memory Address (SMA) space (as shown in 302 and 304 of FIG. 3) is above a certain, predefined limit, the SMA is mapped to a Remote Memory Address (RMMA) space, and the access request is routed to the remote memory blade through the proper channels. It should be noted that the memory blade 208 (see FIG. 2) maintains a separate address space called Remote Memory Address (RMMA) space.

In an optically-connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA. Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA, and this RMMA is sent to the remote memory blade 208. The optical plane translates the SMA (as shown in 302 and 304 of FIG. 3) to the respective RMMA and interacts with the remote memory, as illustrated in FIG. 3.

The processor blade (as shown with components 306, 308, and 310a-n in FIG. 3) connects to the remote memory through Electrical-to-Optical (EO)/Optical-to-Electrical (OE) transceivers 312 which are connected to, for example, a Northbridge™ chipset. Note that in a virtualized system the SMA (as shown in 304 of FIG. 3) corresponds to the Machine Address (MA) (as shown in 302 and 304), and in a system without virtualization the SMA (as shown in 302 in FIG. 3) corresponds to the physical address (PA). As shown in the FIG. 3, each processor blade (shown with components 306, 308, and 310a-n) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

Figure 4:
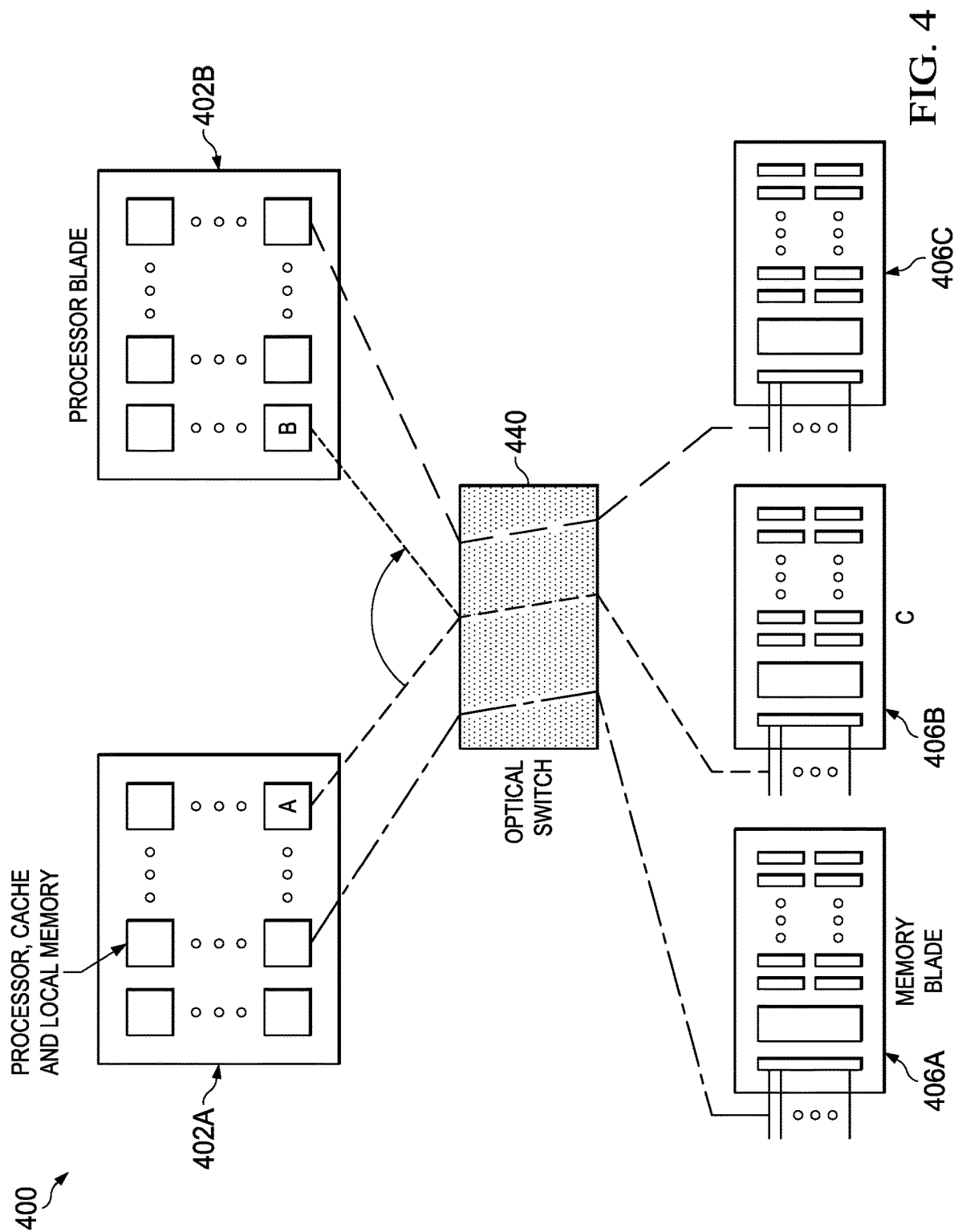
FIG. 4 is a block diagram illustrating a hardware structure for accessing memory at the processor.

In an optically-connected system (as seen in FIG. 2 200), processor nodes access remote memories through independent circuits established between the processor nodes and the remote memory blades. Turning now to FIG. 4, an exemplary block diagram 400 showing a hardware structure for switching memory through an optical interconnection fabric in a computer system is depicted. Processor B 402B establishes a circuit with the remote blade C 406B and gains access to the data previously held by processor A 402A. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 402 (shown as 4027A and 402B) can allocate memory from a remote memory blade by initiating a circuit with the memory blade 406 (shown as 406A-C) and sending the memory request to the remote memory controller. In such a memory system, a processor node 402 holding super pages within a remote memory blade can signal another processor to establish a circuit with the remote memory blade 406 (shown as 406A-C) initiating a transfer of memory space to the latter processor node. The former processor node (e.g., processor A 402A) can send the RMMA address space to the receiving processor node (e.g., processor B 402B), which can access the same data resident on the supplied address space. The sending processor may tear down (e.g., disconnect) the circuit with the remote memory blade 406 (shown as 406A-C) if it no longer requires any super pages at that memory blade (e.g., memory blade 406B). Such a process of transferring address space across processor nodes is referred to as memory switching. The memory switching process is shown in FIG. 4, where a processor node A 402A sends data stored in a remote memory blade C 406 to a processor node B 402B. The processor B 402B initiates a circuit with the remote memory blade C 406. Note that as a memory blade 406 may have multiple channels, the memory space of the memory blade 406 may be shared across multiple processor nodes, each memory space occupying a non-overlapping portion of the total space within the memory blade 406. Also, the source and destination side of memory switching may be referred to as switch-out and switch-in operations, respectively.

While the above-described compute environment is preferred, it is not intended to be limiting. Aspects of the disaggregated compute system of this disclosure may be implemented in a data center that provides a conventional cloud computing model of service delivery. Thus, for completeness, the following section provides additional details regarding cloud computing.

Cloud Computing

Cloud computing enables convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A typical cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the IBM Security Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 5:
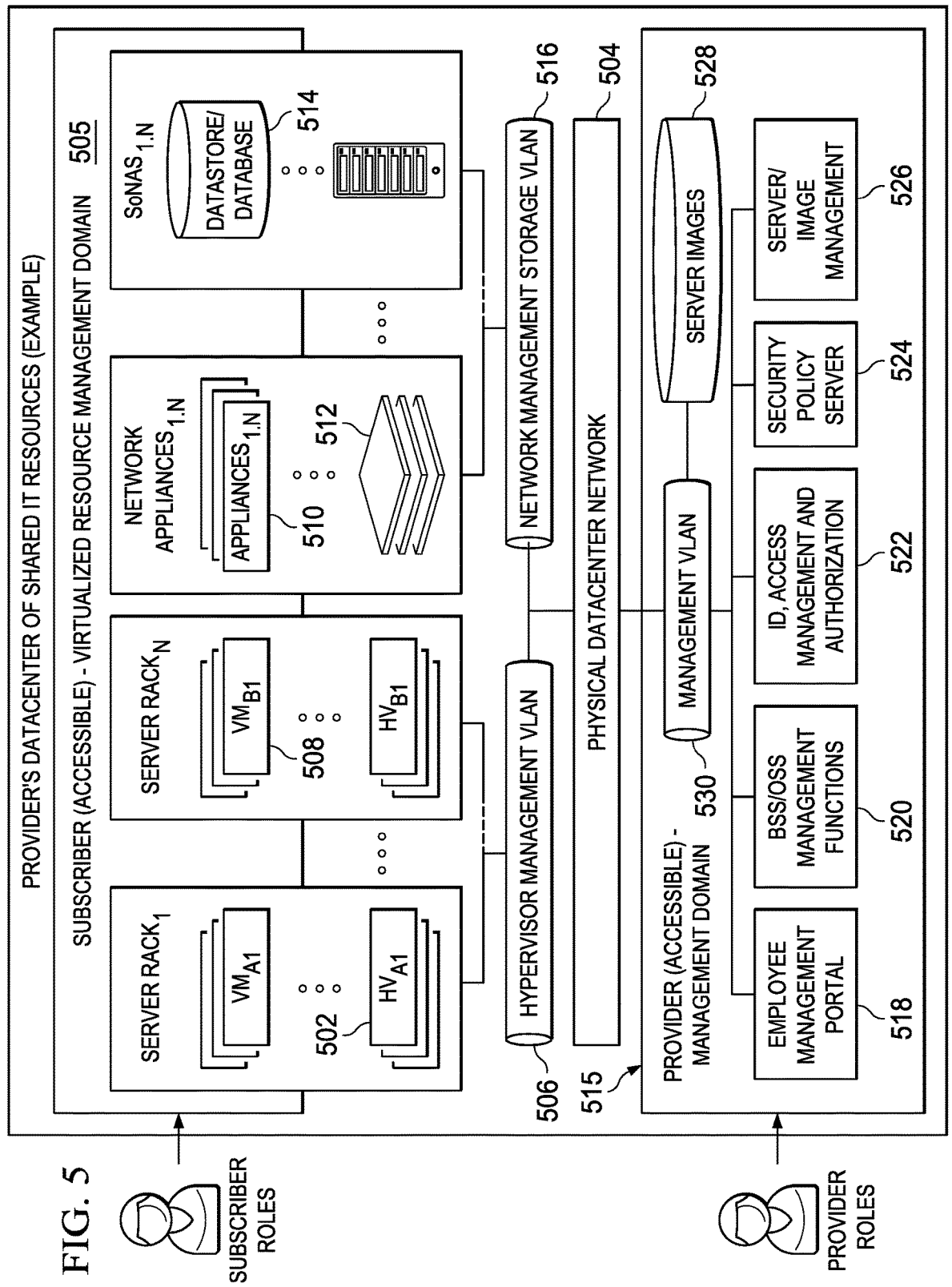
FIG. 5 depicts a disaggregated compute system according to this disclosure.

FIG. 5 illustrates a typical IT infrastructure that supports virtualization of resources and in which the below-described techniques of this disclosure also may be implemented in whole or in part. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 5, an example virtual machine hosting environment (alternately referred to herein as a data center or "cloud") is illustrated. This environment comprises host machines (HVs) 502 (e.g., servers or like physical machine computing devices) connected to a physical datacenter network 504, typically via a hypervisor management VLAN 506. Although not depicted explicitly, typically the environment also includes load balancers, network data switches (e.g., top-of-rack switches), firewalls, and the like. As shown in FIG. 5, physical servers 502 are each adapted to dynamically provide one or more virtual machines (VMs) 508 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 510 are hosted in network appliances 512, and tenant data is stored in data stores and databases 514. The applications and data stores are connected to the physical datacenter network 504, typically via a network management/storage VLAN 516. Collectively, the virtual machines, applications and tenant data represent a subscriber-accessible virtualized resource management domain 505. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 515. This domain comprises a provider employee management portal 518, the BSS/OSS management functions 520, various identity and access management functions 522, a security policy server 524, and management functions 526 to manage the server images 528. These functions interface to the physical datacenter network via a management VLAN 530. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

Disaggregated Server Systems

The above description provides several representative operating environments. This section provides additional details regarding how to provision and manage a disaggregated server.

In particular, preferably server resources in or across one or more data centers are disaggregated into shared server resource pools, namely, one or more of: a compute pool, a memory pool, an accelerator pool, a storage pool, and the like. As noted above, servers preferably are constructed dynamically, for example, on-demand and based on workload requirements, by allocating from these resource pools. Preferably, a disaggregated compute system of this type keeps track of resources that are available in the shared server resource pools, and manages those resources based on that information.

According to one embodiment of such a system, a tracking mechanism associated with the disaggregated compute system includes a database. The database stores data that tracks resource state or status (e.g., idle or used CPUs, memory, accelerator, and other components) of the various resources that define a server available from the resource pools. Additionally, the database stores a data record (or, more generally, a data set) that, for each defined server (sometimes referred to as a "server entity"), identifies the resources (e.g., the CPU(s), memory, accelerator, or other components) that comprise the server. Preferably, the data record is associated with an identifier, such as a unique server ID, and each resource that comprises the server is associated in the database with that unique server identifier. The individual components of the resource pools also include identifiers that are tracked in the database. The resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

In response to a request for data center resources, e.g., when allocating a new server, a server entity is defined by selecting resources from the one or more resource pools. The resources may be selected based on a projected need or specified demand associated with the request, or some other criteria. The server entity is associated with the unique server ID, which is stored in the database together with the identifiers for the resources that comprise the server entity. The server entity may then be scaled up or down as necessary based on the workload requirements of the request or one or more related or associated requests.

Thus, for example, as the request is processed, or as additional related requests are received for processing, the tracking system monitors usage to determine if an adjustment to the resources comprising the server entity is needed. When, based on the monitoring, the tracking system determines that an adjustment in the server entity components is necessary, the adjustment is carried out, e.g., by changing the allocation of resources that are associated with the server entity. Thus, for example, when additional compute and memory are needed (scale-up), the tracking system (by itself, or by cooperation with other resource provisioning systems in the data center) adjusts the server entity, e.g., by selecting additional processors and memory, which are then added to the server entity. These additional processors and memory may be selected based on one or more criteria, such as load, proximity to the existing resources that comprise the server entity, availability, and the like, as indicated by the information being maintained and tracked in the database.

When, on the other hand, the monitoring indicates that fewer resources are required (scale-down), the tracking system adjusts the server entity, e.g., by de-selecting certain processors and memory, which are then de-allocated from the server entity and returned to their respective resource pools.

Figure 6:
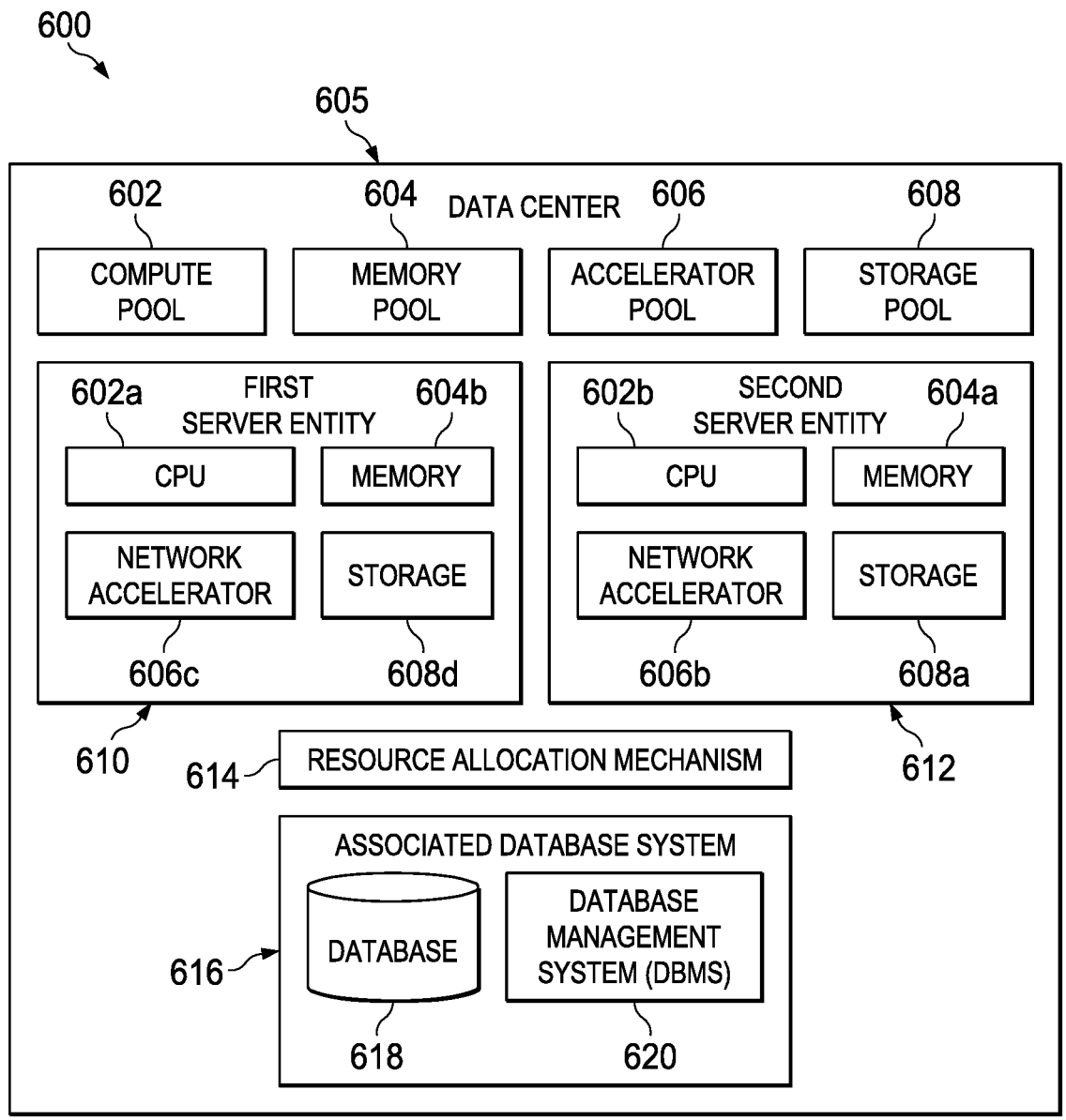
FIG. 6 depicts an alternative data center architecture in which the techniques of this disclosure may be implemented.

With reference now to FIG. 6, a method and system for specifying a disaggregated compute system 600 in this manner is depicted. In a preferred approach, the disaggregated compute system 600 is configured within a data center 605 in which a switching optically-connected memory architecture is used. This architecture was described above in the context of FIGS. 1-4, but it is not intended to be limiting. In the disaggregated compute system 600, there are shared server pools, e.g., a compute pool 602, a memory pool 604, an accelerator pool 606, a storage pool 608, and perhaps others. There may be a single instance of a resource pool, or multiple such instances (sometimes referred to as "multiple pools"). In the approach herein, particular servers that service customer workloads are constructed dynamically, for example, on-demand and based on workload requirements, by allocating from these resource pools. Thus, for example, a first server entity 610 may comprise CPU 602a (selected or otherwise obtained from compute pool 602), memory 604b (selected or otherwise obtained from memory pool 604), accelerator 606c (selected or otherwise obtained from accelerator pool 606), and storage 608d (selected or otherwise obtained from storage pool 608). A second server entity 612 may comprise CPU 602b, memory 604a, accelerator 606b and storage 608a. These examples are merely representative. Moreover, and as will be described, the particular server pool resources that comprise a given server entity may change.

Preferably, once a particular resource of a resource pool is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 600 has the capability to keep track of resources that are available in the shared server resource pools and that are allocated or de-allocated to the various server entities. To this end, the disaggregated compute system 600 comprises (or has associated therewith) a tracking system comprising a resource allocation mechanism 614, and an associated database system 616. Generally, the tracking system is implemented as a data processing system, and it may operate in a standalone manner or as a component of some other system or functionality in the data center.

Typically, the resource allocation mechanism 614 is implemented in software, namely, as set of computer program instructions, executing in one or more hardware processors. The resource allocation mechanism 614 may comprise one or more sub-systems or modules, processes, programs or execution threads, and such components may be co-located or distributed. The resource allocation mechanism 614 generally is responsible for executing one or more allocation algorithms that create and manage server entities according to this disclosure. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources from the existing server entity when less capacity is needed to handle the workload. One or more of such functions may be combined, and other types of algorithms may be implemented by the resource allocation mechanism 614.

The one or more algorithms that comprise the resource allocation mechanism 614 used information stored in the database system 616 to carry out the management functions. As noted above, the database system 616 stores information that tracks the state, status or other properties and attributes of the various resources in the shared server pools. In addition, the database stores information about each server entity built by the resource allocation mechanism. Generalizing, and as well-known, the database system 616 comprises a database 618, namely, a collection of data organized in one or more ways (e.g., via schemas, tables, queries, report, views and other objects), together with a database management system (DBMS) 620, which is a computer software application that interacts with the user, other applications, and the database to capture and analyze data. A general purpose DBMS enables the definition, creation, querying, update and administration of databases. A representative DBMS is IBM® DB2®.

In one embodiment, the database 618 is relational. The database stores a data record (or, more generally, a data set) that, for each defined server entity, identifies the resources that comprise the server. Preferably, the data record is associated with an identifier, a unique server ID, and each resource that comprises the server is associated in the database with that unique server identifier. Thus, continuing with the example described above, the first server entity 610 may be associated with unique server $ID_1$, while the second server 612 may be associated with user server $ID_2$, and so forth.

As also described, preferably the individual components of the resource pools also include identifiers that are tracked in the database; when a resource is allocated to a server entity, the resource's identifier then gets associated with (cross-referenced to) the server entity. Thus, continuing with the first example above, the various resource-specific identifiers for the CPU 602a, memory 604b, network accelerator 606c and storage 608d are associated (by relational tables or otherwise) with unique server ID1, which is the unique server identifier for the first server entity 610. Likewise, and continuing with the second example, the various resource-specific identifiers for the CPU 602b, memory 604a, accelerator 606b and storage 610a are associated with unique server ID2, which is the unique server identifier for the second server entity, and so forth for each server entity.

When the server entity is first built, it includes a set of one or more server pool resources selected from the server pools by the resource allocation mechanism. Thus, the unique server identifier for the server entity will have an initial set of resource-specific identifiers associated therewith. As resources are later allocated or de-allocated from the server entity, the set of constituent resource identifiers associated with a particular server entity identifier thus changes as well.

As noted above, there may be multiple instances of a resource pool. When multiple instances exist, particular resources to support the server entity are then selected from one or more of those instances. Preferably, if resources assigned to a first instance of a resource pool are used to build the server entity, when it becomes necessary to add capacity to that server entity, preferably the additional resources are also drawn from the same instance where possible.

Preferably, the resource-specific identifiers provide information regarding the resource status, attributes, relationship to other resources, and the like. Thus, the database, which may be centralized or distributed, acts as a repository of information regarding server entities, the server pools, and the various resources that comprise a particular server entity.

Although a relational database is useful for implementation, the server entity identifiers and resource-specific identifiers may be related to one another in other ways, e.g., as linked lists, data arrays, hash tables, or otherwise.

In general, the resource allocation mechanism 614 and the database system 616 work together to manage the disaggregated compute system. The resource allocation mechanism functions as a tracking system that keeps track of idle and used CPUs, memory, accelerator and other components that define a server. Additionally, the tracking system keeps a record of each defined server of what CPUs, memory, accelerator or other components are part of the server. As noted, and for the each defined server, a unique ID is specified, and the requested number of CPUs, memory and storage are selected from the pool of idle resources, e.g., based on their locality, best fit and future expansion needs as will be further described. The unique server ID, and also IDs of each of these resources, are recorded in the tracking system. Preferably, and as noted above, the used components are marked as used and are removed from the pool of idle components.

Preferably, each component of the server entity is tagged with the unique server ID with which it is a part. Thus, the component is made aware that it is a component of the server entity identified by the unique server ID.

Preferably, each request issued to the disaggregate compute system, as well as the data received in response to the request, also are tagged with the server entity ID. When, for example, the request is received at a resource, the resource then compares the server entity ID tagged to the request to the server entity ID for the resource. In other words, the component is provided with the capability to check if the request matches the server entity ID to which the component has been allocated. If so, the component recognizes the request as something that can be consumed and acted upon. When the server entity ID tagged to the request does not match the server entity ID tagged to the component, the component knows that the request can be ignored.

As will be described, the algorithms used for resource selection (new server allocation, server scale-up and server scale-down) can use common criteria to facilitate the selection, or these algorithms can differ from one another, e.g., based on the resource topology and the purpose of resource allocation. When resources are interconnected, more flexibility in allocated resources is available to the system. For resources that are not directly interconnected, preferably the algorithm(s) consider the hierarchy of resources, as well as other factors, such as number of hops, latency, cost and so forth. In the latter case, preferably the algorithm tries to minimize the number of hops.

Managing Software Licenses in a Disaggregated Environment

With the above as background, the techniques of this disclosure are now described.

According to this disclosure, the disaggregate system is augmented to include a "license manager" that manages software licenses in the system. Generally, the license manager determines an optimal licensing based on current resources allocated, and then re-allocates needed licenses as needed, e.g., as the disaggregated server itself changes its allocated resources. The notion here of a "license manager" refers generally to the high level functionality or operation, and not necessarily to a particular implementation. One convenient way to implement the license manager is as part of the resource allocation mechanism 614 in FIG. 6, although the manager may be a separate or standalone function or codebase. The license manager may be a system, sub-system, device, process, program or combination thereof. Various functions that comprise the license manager may be integrated, co-located or remote from one another. One or more functions or sub-functions may be components of other systems. Thus, the particular implementation for the license manager is not intended to be limited by any such constraints. Moreover, the notion of "optimal" with respect an "optimal licensing" (e.g., a set of applicable licenses) is not intended to refer to some absolute value but may itself be relative to some other value or constraint.

Further, the word "license" itself is not intended to be limiting, although typically it refers to a software license. The basic notion is that some resource associated with a disaggregated system (such as a server) has associated therewith a license (or, more generally, a right to use) that must be managed when that resource is a component of the system. As the composition of the disaggregate system changes dynamically, the license manager adjusts the necessary licenses accordingly so that the system can continue to execute its workload appropriately.

A license may be associated with any type of resource in the disaggregated server. Moreover, a particular license may be associated with more than one resource, such as a single license associated with a combination of a processor selected from the processor pool, and a memory selected from the memory pool. A license may be associated with one or more license types each of which has a defined or configurable characteristic for the type. Just as the system includes resource pools, preferably there is a pool of licenses from which a particular license can be obtained, applied to a disaggregated server entity or some component thereof, and then returned to the pool once the particular license is no longer needed. When a license is obtained from the license pool, preferably it is marked in the pool as being unavailable.

Figure 7:
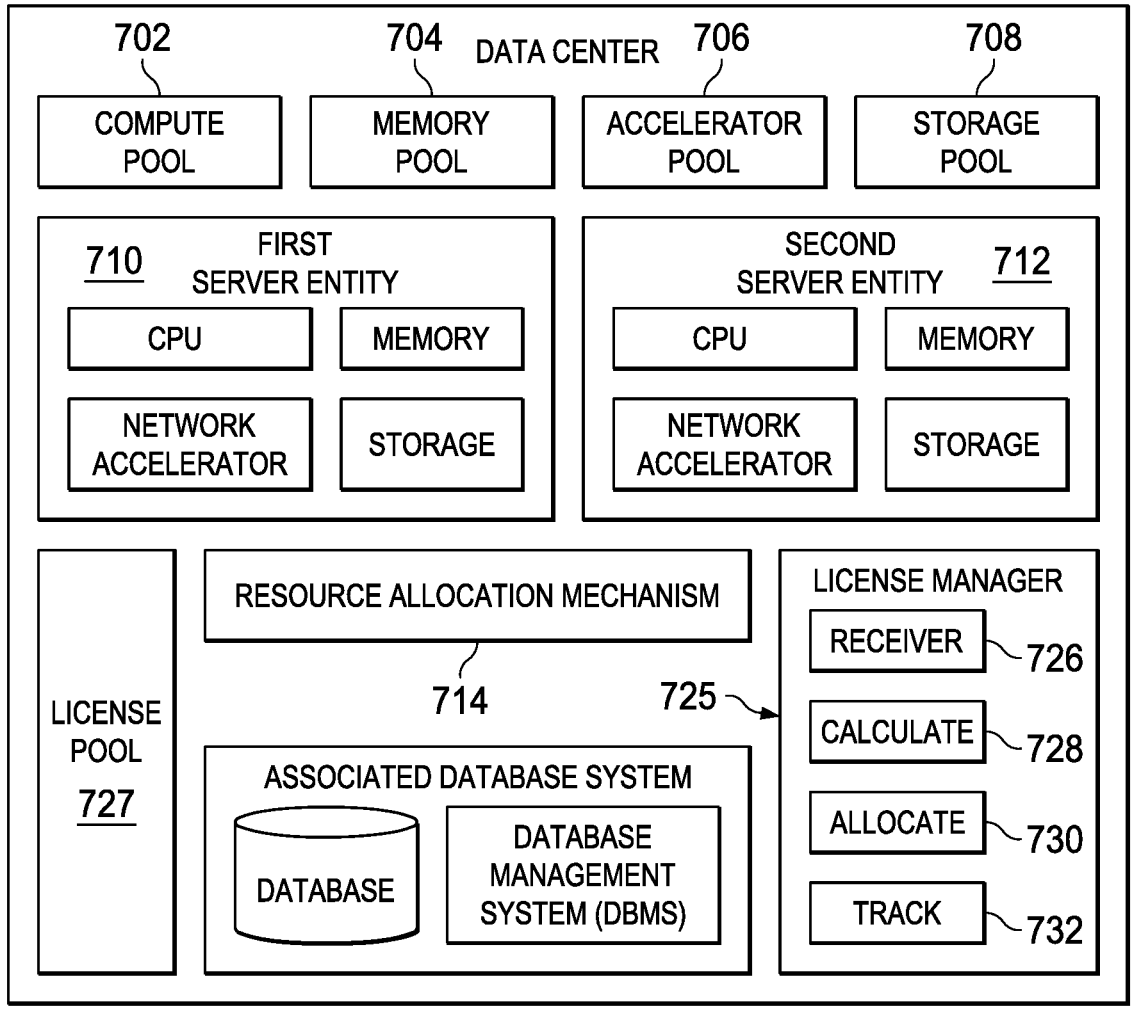
FIG. 7 depicts the architecture of FIG. 6 that is augmented to include a license manager according to this disclosure.

Thus, and with reference now to FIG. 7, according to this disclosure, a license manager 725 is in operative communication with other component provisioning systems in the data center, such as the resource allocation mechanism 714 previously described. Generally, and as described above, the license manager 725 is operative to track the hardware components (e.g., taken from pools 702, 704, 706 and 708) used for a disaggregated server (e.g., first server entity 710 or second server entity 712), and to adjust the licenses needed to enable each server entity to run its workload. To this end, and as noted above, there is a pool 727 of available licenses for the resources (processors, memories, accelerators, storage, etc.) that may be used to compose a disaggregate server entity. As noted above, typically the license is a license for a software product, but this is not a limitation. In a typical operating scenario, the aggregate cost of licenses for the server entity depends on a number and type of the various resources assigned to the particular server entity. The assigned resources that impact the cost of a license include, without limitation, CPUs from compute pool 702, memories from memory pool 704, accelerators from accelerator pool 706, and others such as GPUs, software platform components (such as Spark clusters), and the like. When a disaggregated system (such as server entity 710 or server entity 712) changes, e.g., due to scaling it up, down, or due to exchange of its components or resources assigned, the license manager 725 preferably is operative to recalculate the needed licensing for appropriate license coverage, re-allocate the necessary licenses, adjust the tracking of the licenses, and manage billing/invoicing for any modified license costs. The license manager 725 may recalculate the licenses each time there is a change to a server entity, or based on some other factor, e.g., a degree to which the server entity composition exceeds some configurable threshold. As previously noted, license recalculations (and re-allocations) may be deferred, e.g., while a current workload is being processed, or until a given time period, or the like. Thus, while in the preferred embodiment any change to the composition of a server entity triggers execution of the license manager, it is not required that the re-computation and re-application of the license coverage be changed immediately, although typically it will be.

As depicted, typically the license manager 725 comprises several components (or, more generally, functions): a receiver 726, which receives information (e.g., the unique server ID, server component IDs, resource type, etc.) about a disaggregated server and its allocated components and, based on that received information, determines whether a then-current set of licenses (a current licensing configuration) provides an appropriate license coverage, a license cost calculator 728, which operates to calculate the cost associated with a license, a license allocator 730, which operates to allocate (and re-allocate) licenses to the system when it has been determined by the receiver that the current licensing configuration is not appropriate (and thus needs to be changed), and a license tracking and billing component 732, which tracks what licenses are configured and invoices a data center customer for those licenses. These components (or some of them) may be integrated, or they may execute as distinct components. Preferably, each component is implemented in software (one or more instruction sets of computer program instructions) executing on one or more hardware processers. These components (or any of them) may be co-located or distributed from one another.

The receiver 726 interoperates with the database system 616 as necessary to obtain the server and server component identifying information. As described above, this information enables tracking of what components comprise a server entity, and to track changes in that entity. Thus, through the receiver 726 the license manager has a view into what components then comprise the server entity even as the composition of the server entity may be changing dynamically. As noted, the receiver 726 includes some code checking component that determines whether the current licensing configuration is appropriate given the information received about the server entity composition. As noted above, due to the operation of the resource allocation mechanism, a particular composition of the server entity may change; when a change in the server entity composition occurs, what had then been the current licensing configuration may no longer be appropriate, e.g., because the number and nature of the licenses in that configuration are insufficient to provide appropriate coverage for the new/adjusted server entity composition, because the server entity is then over-licensed (too many licenses are allocated), or the like. Preferably, the receiver 726 operates in real-time or near real-time such that changes to a server entity are provided to the license manager as soon as they occur (or as near in time as possible) so that, as necessary, appropriate license changes can be computed and implemented (and accounted for) by the other license manager sub-components described below. In an alternative embodiment, the receiver 726 may operate asynchronously with respect to the resource allocation mechanism, e.g., by receiving notifications of server entity changes at some subsequent time such as the end of a processing cycle, the end of the day, or the like. In one such alternative embodiment, the license changes are determined periodically, e.g., once per day.

The license cost calculator 728 typically execute one or more license cost calculation algorithms. These algorithms may perform simple calculations (e.g., based on a fixed cost times a number of license copies) to much more complex cost calculations that factor in time of day, load, latency, and other performance parameters, as well as combinations of such factors. The techniques herein are not limited to any particular cost calculation routine or algorithm.

The license allocator 730 is a software process that associates licenses to server entities, preferably by keeping track internally of the relevant data derived from the resource allocation mechanism, and by associating and/or re-associating identifying information about the licenses with identifying information about the server components.

The license tracking and billing component 732, as its name implies, manages the actual tracking of the licenses that are allocated or re-allocated to the server entity for a particular data center customer, and then integration of that data with other data center billing systems and operations.

The notion here of "re-allocating" should also be construed as including "de-allocating," i.e., removing a license from a set of license otherwise applicable to the server entity.

Typically, the license allocator maintains, for each server entity, a set of one or more applicable licenses. The particular licenses that are included in the allocation may then be varied as the receiver receives an indication that the composition of the server entity has been changed. More generally, the license manager has associated therewith a "pool" of licenses from which individual licenses may be obtained and associated with a server entity, as will be described in more detail below.

Preferably, the license manager executes to provide its software license management function during one or more operating scenarios, each of which is now described in further detail. These operating scenarios include, without limitation: initial license allocation on a disaggregated system, scaling up of a disaggregated system, scaling down of a disaggregated system, temporarily suspending a disaggregated system, failover of a disaggregated system, and de-allocating a disaggregated system.

Figure 8:
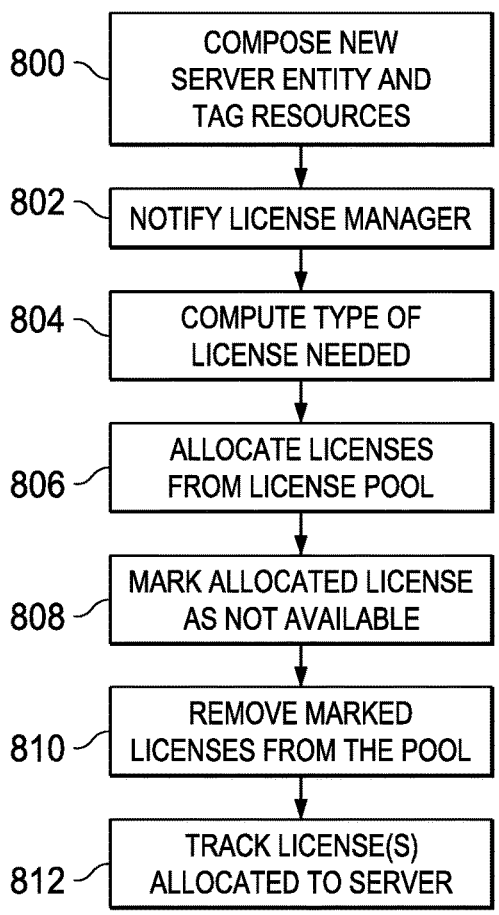
FIG. 8 depicts a process flow for an initial license allocation method according to a first embodiment.

A first operating scenario, which is depicted in FIG. 8, is the initial license allocation on the disaggregated system. As noted above, when a disaggregated server is provisioned, preferably a unique server ID is assigned to that server entity. As also noted, preferably the components are allocated to the server from different pools of available resources, and each of the components also preferably is tagged with that server ID. This is step 800. When an application (or, more generally, some resource) that requires licensing is installed and started on this disaggregated server, this is indicated to the license manager. This is step 802. In particular, the license manager receives information of the server ID, and the amount and type of resources assigned to it. At step 804, the license cost calculator calculates an optimal type of license needed for this configuration. At step 806, the license allocator allocates an available license (or multiple licenses), as recommended by the license calculator, and allocates it (or them) to this disaggregated server. This then becomes the "current license configuration" for the server entity. Then, at step 808, the one or more licenses are marked as not available and, at step 810, these allocated license(s) removed from the pool of licenses otherwise available to the license manager. Steps 808 and 810 may be combined; in the alternative, step 810 may not be necessary if marking the license as not available has the effect of removing it from the license pool. At step 812, the license tracking and billing component starts tracking the license(s) as allocated to this server ID, and starts its billing to that server. Preferably, this information of server ID is connected with the account to which the server is billed, and appropriate license costs are added there. This completes the initial license allocation routine.

Figure 9:
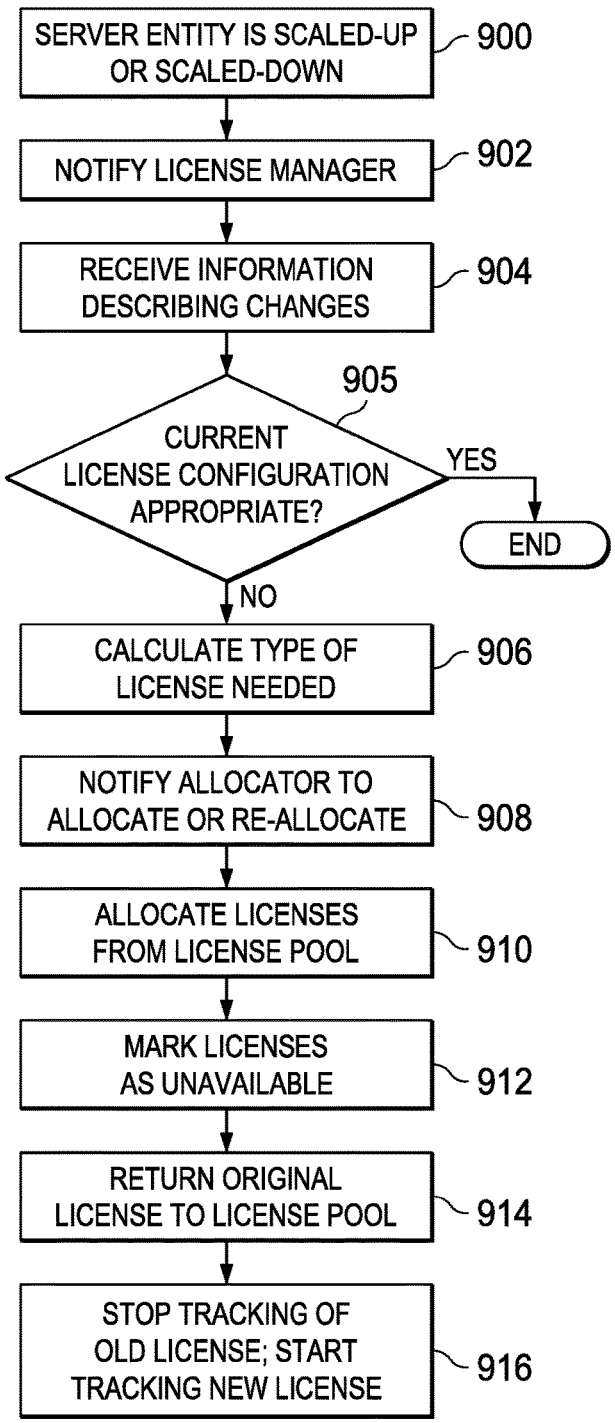
FIG. 9 depicts a process flow for a scale-up or scale-down license allocation method according to a second embodiment.

FIG. 9 depicts the operation of the license manager with respect to a scale-up or scale-down of the disaggregated system. As discussed above in the context of FIG. 6, typically a disaggregated system is scaled up or down when more or less resources need to be added to the existing server ID. This is step 900. At step 902, and based on the resource allocation mechanism determining the new resource type and amount (and component IDs) that are required by the disaggregated system, an indication that scale-up or scale-down has occurs is provided to the license manager. At step 904, the license manager receiver receives information of the server ID, and the amount and type of its then-allocated resources, as determined by the resource allocation mechanism. At step 905, a test is performed to determine whether the current license configuration is still appropriate. If the outcome of the test at step 905 is that the current license configuration is still appropriate for the server entity as modified, then the routine terminates. If, however, the outcome of the test at step 905 indicates that the current license configuration needs to be changed (e.g., due to under-licensing or over-licensing), the routine continues at step 906. At step 906, the license cost calculator calculates the optimal type of license needed for this new (i.e. modified) configuration. When the license calculator determines that a different type or amount of the license is needed, this is indicated to the license allocator at step 908. At step 910, the license allocator allocates an available license (or multiple ones), as recommended by the license calculator, and allocates it (or them) to this disaggregated server. At step 912, once again these licenses are marked as not available, and they are removed from the pool of available licenses. At step 914, optionally the original license used by the server entity is returned, marked as available, and it is returned to the pool of available licenses. At step 916, the license tracking and billing component is notified to stop tracking of the previous license (if necessary), and to start tracking the new license to this server ID, and to associate the license charges to that server. Steps 912, 914 and 916 may be carried out concurrently or in a different order. This completes the scale-up or scale-down license manager operations.

Figure 10:
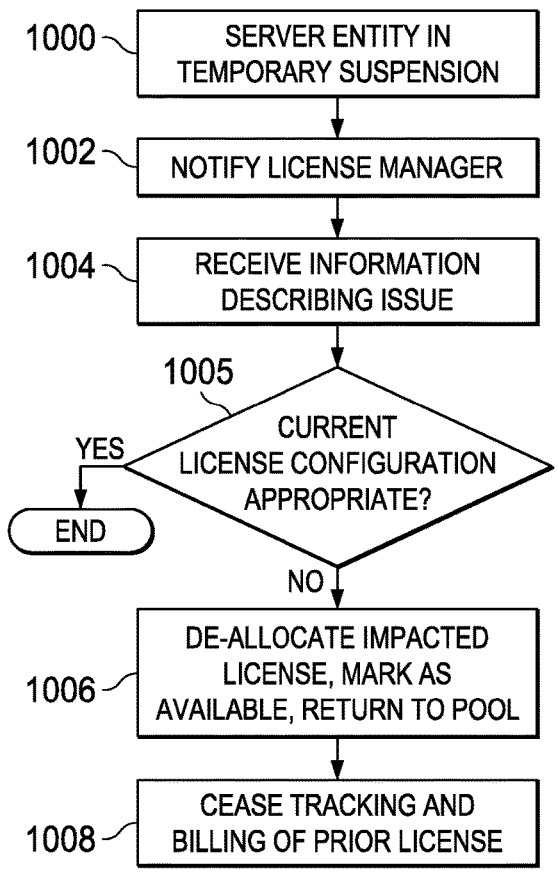
FIG. 10 depicts a process flow for the license manager during a suspension event according to a third embodiment.

FIG. 10 depicts the operation of the license manager with respect to a temporary suspension of the disaggregate system. As previously described, and unlike traditional hard-wired systems, a disaggregated system can be temporarily suspended, e.g., such that it has no CPUs or GPUs assigned to it. For a traditional system, removal of a CPU resources or deleting of an OS image results in loss of its memory state. As depicted in FIG. 4, a disaggregated server keeps its memory state and server ID after removal of compute resources, and thus it can be restarted easily. In this embodiment, the disaggregate server is in the temporary suspension state, as indicated at step 1000. At step 1002, the removal of the CPU (or other) resource is indicated to the license manager. At step 1004, the license manager receives information of the server ID. At step 1005, a test is performed to determine whether the current license configuration is still appropriate. If the outcome of the test at step 1005 is that the current license configuration is still appropriate for the server entity as modified, then the routine terminates. If, however, the outcome of the test at step 1005 indicates that the current license configuration needs to be changed (e.g., due to under-licensing or over-licensing), the routine continues at step 1006. At step 1006, license allocator operates to de-allocate each impacted license, mark it as available, and then returns that license to the pool of available licenses. At step 1008, the license tracking and billing component ceases tracking and billing of the previous license, returns the license to the pool of available licenses (if not already done), and takes one or more other configured actions. For example, the data center may apply a "standby" fee to the server ID, which the tracking and billing component then continues to track and apply.

Figure 11:
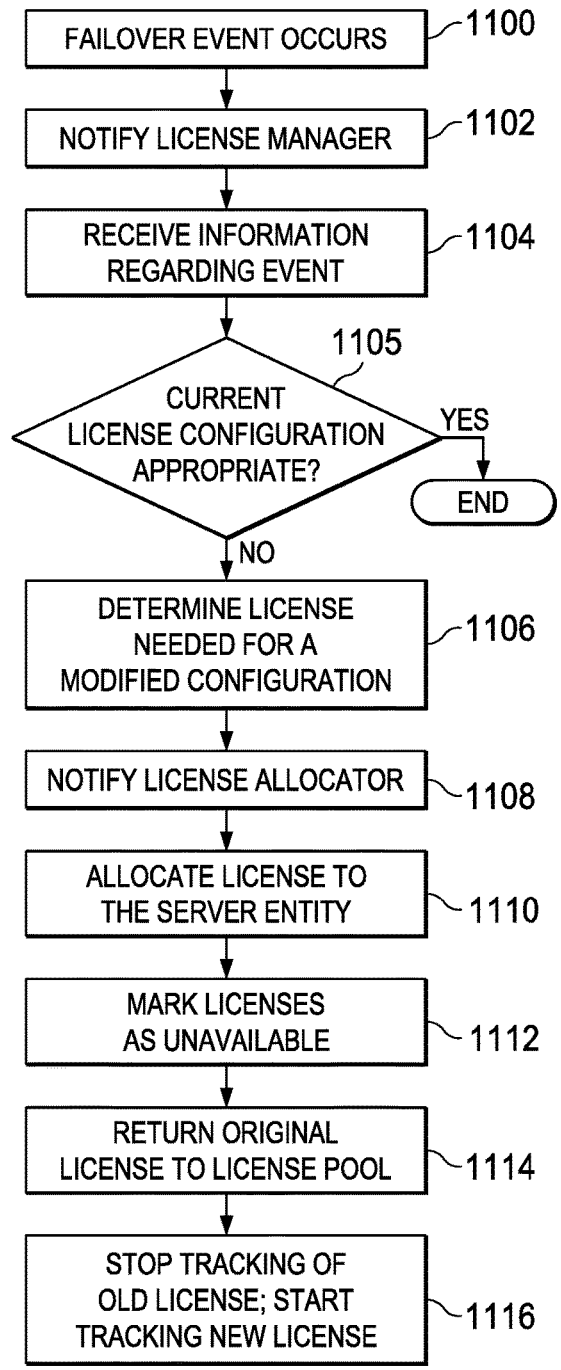
FIG. 11 depicts a process flow for the license manager during a failover event according to a fourth embodiment.

FIG. 11 depicts an operation of the license manager with respect to failover of a disaggregate server entity. In the embodiment, it is assumed that the resource allocation mechanism includes a resilience management function that de-allocates failed components from a server entity upon given failure events, e.g., complete or partial failure of CPUs, a resilience manager component (e.g., associated with the resource allocation mechanism) de-allocated failed CPUs, and also has the capability to re-allocated new CPUs to the server. The newly allocated CPUs can be equal or different amount and type than the original CPUs. Thus, licensing may be impacted in this scenario as well. The routine begins at step 1100 when the failover event occurs. At step 1102, the license manager is notified. At step 1104, the license manager receives information on the amount and type of newly allocated CPUs (or other resources). At step 1105, a test is performed to determine whether the current license configuration is still appropriate. If the outcome of the test at step 1105 is that the current license configuration is still appropriate for the server entity as modified, then the routine terminates. If, however, the outcome of the test at step 1105 indicates that the current license configuration needs to be changed, the routine continues at step 1106. At step 1106, license cost calculator calculates an optimal type of license needed for the modified configuration and then, at step 1108, provides a notification to this effect to the license allocator. At step 1110, the license allocator allocates an available license, as recommended by the license calculator, and allocates it to this disaggregated server. At step 1112, this license is marked as not available, and it is removed from the pool of available licenses. At step 1114, the original license used by this server is returned, marked as available, and it is returned to the pool of available licenses. At step 1116, the license tracking and billing component stops tracking the previous license, and this component then starts tracking the new license to this server ID, and billing to that server. This completes the failover processing.

Figure 12:
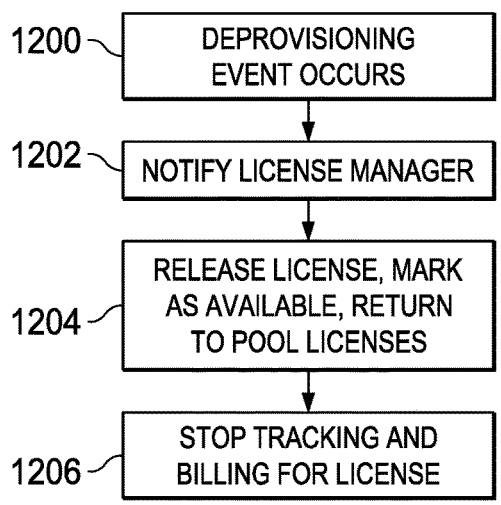
FIG. 12 depicts a process flow for the license manager upon de-allocation of a server entity according to a fifth embodiment.

FIG. 12 depicts an operation of the license manager in the event of a temporal or permanent de-provisioning of a disaggregated server. The basic operation here is to return any applicable license (for the server or any component therein) back to the pool of available licenses. The routine begins at step 1200 upon occurrence of the temporal or permanent de-provisioning event. At step 1202, the license manager is notified of the event. At step 1204, the license allocator releases each assigned license, marks it available, and returns it to the pool of available licenses. At step 1206, the billing component stops billing the license. This completes the processing.

The determination steps (FIG. 9, step 905; FIG. 10, step 1005; FIG. 11, step 1105, etc.) may be carried out by other components, e.g., the license cost calculator, or the operation may be combined with one or more other of the described operations.

The license manager tracks operating system image(s) to facilitate its processing. As has been described, licenses are managed dynamically with fine temporal granularity that is connected to various operating scenarios of the server entity in the data center. These include, without limitation, the activation and deactivation of a server, suspension, failover, and so on. The license manager may have associated therewith a set of default billing templates that provide for different accounting arrangements for the licenses depending on various factors. As previously described, in one embodiment, and when a server is suspended, the license fee is not billed, but a standby fee is charged to have software ready to be instantaneously deployed when the suspension ends. No particular billing arrangement is contemplated by the techniques herein; rather, the license manager provides the mechanisms necessary to carry out whatever license management functions are desired. To that end, the license manager may also include user interfaces for provisioning and configuration of license management policies, or the defining of default policies. License management policies may be retrieved and configured dynamically, e.g., in response to given occurrences in the server entity.

The techniques described herein provide significant advantages. They enable initial resources and their applicable software licenses to be appropriately allocated based on projected need, and to have the appropriate licenses adjusted to conform to any dynamic scale-up or scale-down (or failover) of physical or virtual hardware capacity. Because a server entity is built-up from allocation of a subset of processors, a subset of memory, etc., only those resources that are needed to handle the workload are used, and only those licenses that are necessary to facilitate that workload processing are applied. Further, when changes to the server entity are required or occur, the system adjusts the licenses needed. Because the overall approach leverages disaggregated servers, the data center provider realizes greater modularity, higher resource utilization, and better performance, while the data center customer (user) obtains such benefits at lower costs of licensing. Indeed, with the emergence of larger data centers and the need for clouds with ever-larger numbers of servers, the approach provides a way for a data center to operate in a much more cost-effective and reliable manner, and to provide its customers with appropriate licenses, and preferably only those licenses that are needed for their varying workload requirements.

The advantages described herein are provided for by maintaining and using the various resource server pools, the resource allocation mechanism that enables generation and management of the server entities, and the license manager that works together with the resource allocation mechanism to manage the required licenses for the workload even as there are dynamic changes to the server entity composition. An embodiment of such an approach that further includes the tracking system and its associated database of unique server identifiers and their associated data enables the system to provide more robust inventory management over the server resource pools and the licenses, and to ensure that such licenses are appropriately provisioned as scale-up and scale-down algorithms adjust the server entity composition.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The license manager (or components thereof) may be part of the resource allocation mechanism. The license manager may operate as a standalone service that is used by multiple data centers that implement disaggregate compute environments; thus, the pool of licenses may be shared across data centers.

The techniques herein generally provide for the above-described improvements to a technology or technical field, as well as the specific technological improvements to workload management schemes, such as described above.

Having described our invention, what we now claim is as follows:

1. A method for managing licenses in a disaggregated compute environment, the disaggregated compute environment comprising a set of server resource pools, wherein each server resource pool comprises a set of resources of a common type, comprising:
    providing a pool of licenses available to be associated with resources drawn from the server resource pools;
    responsive to provisioning of a server entity composed of resources drawn from the server resource pools, the server entity being a disaggregated server entity, determining a license configuration suitable for the server entity as provisioned, the license configuration including at least one license drawn from the pool of licenses, wherein the at least one license drawn from the pool of licenses is marked in the pool of licenses as unavailable; and
    responsive to receipt of information indicating a change in a composition of the server entity, determining whether an adjustment to the license configuration is required;
    upon a determination that an adjustment to the license configuration is required, determining an adjusted license configuration for the server entity.

2. The method as described in claim 1 wherein the change in the composition of the server entity occurs upon one of: scale-up of the server entity, scale-down of the server entity, suspension of the server entity, failover of the server entity, and de-allocating the server entity.

3. The method as described in claim 1 further including applying the adjusted license configuration to the server entity by one of: obtaining another license from the pool of licenses, and returning a license to the pool of licenses.

4. The method as described in claim 3 wherein a license returned to the pool of licenses is marked as available to be associated with a server entity.

5. The method as described in claim 1 further including:
    determining a license cost associated with the license configuration; and
    tracking the license cost to a tenant associated with the server entity.

6. The method as described in claim 5 wherein determining the license cost associated with the license configuration is based on factors that include:
    number of license copies, time of day, load, latency, other performance parameters, and combinations thereof.

7. The method as described in claim 1 wherein the license configuration and the adjusted license configuration are determined based on a number and type of resources that comprise the server entity.

8. Apparatus for managing licenses in a disaggregate compute environment, the disaggregated compute environment comprising a set of server resource pools, wherein each server resource pool comprises a set of resources of a common type, comprising:
    one or more hardware processors;
    computer memory holding computer program instructions executed by the hardware processors and operative to:
        provide a pool of licenses available to be associated with resources drawn from the server resource pools;
        responsive to provisioning of a server entity composed of resources drawn from the server resource pools, the server entity being a disaggregated server entity, determine a license configuration suitable for the server entity as provisioned, the license configuration including at least one license drawn from the pool of licenses, wherein the at least one license drawn from the pool of licenses is marked in the pool of licenses as unavailable; and
        responsive to receipt of information indicating a change in a composition of the server entity, determine whether an adjustment to the license configuration is required;
        upon a determination that an adjustment to the license configuration is required, determine an adjusted license configuration for the server entity.

9. The apparatus as described in claim 8 wherein the change in the composition of the server entity occurs upon one of: scale-up of the server entity, scale-down of the server entity, suspension of the server entity, failover of the server entity, and de-allocating the server entity.

10. The apparatus as described in claim 8 wherein the computer program instructions are further operative to apply the adjusted license configuration to the server entity by one of: obtaining another license from the pool of licenses, and returning a license to the pool of licenses.

11. The apparatus as described in claim 10 wherein a license returned to the pool of licenses is marked as available to be associated with a server entity.

12. The apparatus as described in claim 8 wherein the computer program instructions are further operative to:
    determine a license cost associated with the license configuration; and
    track the license cost to a tenant associated with the server entity.

13. The apparatus as described in claim 12 wherein the computer program instructions are further operative to determine the license cost associated with the license configuration based on factors that include: number of license copies, time of day, load, latency, other performance parameters, and combinations thereof.

14. The apparatus as described in claim 8 wherein the license configuration and the adjusted license configuration are determined based on a number and type of resources that comprise the server entity.

15. A computer program product in a non-transitory computer readable medium for use in a data processing system for managing licenses in a disaggregated compute environment, the disaggregated compute environment comprising a set of server resource pools, wherein each server resource pool comprises a set of resources of a common type, the computer program product holding computer program instructions executed in the data processing system and operative to:
provide a pool of licenses available to be associated with resources drawn from the server resource pools;
responsive to provisioning of a server entity composed of resources drawn from the server resource pools, the server entity being a disaggregated server entity, determine a license configuration suitable for the server entity as provisioned, the license configuration including at least one license drawn from the pool of licenses, wherein the at least one license drawn from the pool of licenses is marked in the pool of licenses as unavailable; and
responsive to receipt of information indicating a change in a composition of the server entity, determine whether an adjustment to the license configuration is required;
upon a determination that an adjustment to the license configuration is required, determine an adjusted license configuration for the server entity.

16. The computer program product as described in claim 15 wherein the change in the composition of the server entity occurs upon one of: scale-up of the server entity, scale-down of the server entity, suspension of the server entity, failover of the server entity, and de-allocating the server entity.

17. The computer program product as described in claim 15 wherein the computer program instructions are further operative to apply the adjusted license configuration to the server entity by one of: obtaining another license from the pool of licenses, and returning a license to the pool of licenses.

18. The computer program product as described in claim 17 wherein a license returned to the pool of licenses is marked as available to be associated with a server entity.

19. The computer program product as described in claim 15 wherein the computer program instructions are further operative to:
determine a license cost associated with the license configuration; and
track the license cost to a tenant associated with the server entity.

20. The computer program product as described in claim 19 wherein the computer program instructions are further operative to determine the license cost associated with the license configuration based on factors that include: number of license copies, time of day, load, latency, other performance parameters, and combinations thereof.

21. The computer program product as described in claim 15 wherein the license configuration and the adjusted license configuration are determined based on a number and type of resources that comprise the server entity.

* * * * *